United States Patent
Maldaner et al.

(10) Patent No.: US 9,386,006 B1
(45) Date of Patent: Jul. 5, 2016

(54) AUTHENTICATION MECHANISM FOR DOMAIN REDIRECTION OF A REPRESENTATIONAL STATE TRANSFER (REST)-COMPLIANT CLIENT

(71) Applicant: Citrix Systems, Inc., Fort Lauderdale, FL (US)

(72) Inventors: Juliano Maldaner, Cupertino, CA (US); Vinod Kumar Jammalamadaka, San Jose, CA (US); Thirumalaivelu Alagianambi, Sunnyvale, CA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 14/635,683

(22) Filed: Mar. 2, 2015

(51) Int. Cl.
*G06F 21/45* (2013.01)
*H04L 29/06* (2006.01)
*G06F 17/27* (2006.01)
*G06F 17/22* (2006.01)
*G06F 21/41* (2013.01)

(52) U.S. Cl.
CPC ............ *H04L 63/08* (2013.01); *G06F 17/2235* (2013.01); *G06F 17/2705* (2013.01); *H04L 63/10* (2013.01)

(58) Field of Classification Search
CPC . H04L 67/2814; H04L 63/10; H04L 2209/76; H04L 63/0281; G06F 21/6218
See application file for complete search history.

(56) References Cited

U.S. PATENT DOCUMENTS

| | | | |
|---|---|---|---|
| 8,453,225 B2 * | 5/2013 | Agarwal | H04L 63/0884 726/12 |
| 9,143,502 B2 * | 9/2015 | Hinton | H04L 63/0815 |
| 2005/0204041 A1 | 9/2005 | Blinn et al. | |
| 2006/0294196 A1 | 12/2006 | Feirouz et al. | |
| 2009/0132713 A1 | 5/2009 | Dutta et al. | |
| 2011/0041171 A1 | 2/2011 | Burch et al. | |
| 2013/0014239 A1 | 1/2013 | Pieczul et al. | |
| 2013/0125226 A1 * | 5/2013 | Shah | H04L 63/0815 726/7 |

(Continued)

FOREIGN PATENT DOCUMENTS

WO 0239237 A2 5/2002

OTHER PUBLICATIONS xDAuth: A Scalable and Lightweight Framework for Cross Domain Access Control and Delegation. Alam et al. ACM(2011).*

(Continued)

*Primary Examiner* — Venkat Perungavoor
(74) *Attorney, Agent, or Firm* — BainwoodHuang

(57) ABSTRACT

An initial server responds to a request with a redirection object describing the a different server to which the request should be redirected, and providing additional information about authenticating to the other server. The redirection object includes a session check variable indicating whether a forms-based authentication process may need to be performed, a session URI through which the client may determine whether the client was previously authenticated to the other server, and optionally a forms URI through which the client may initiate a forms-based authentication process. If the session check variable indicates that the other server may require forms based authentication, and an authenticated session does not exist between the client and the other server, and the client has a forms URI for the other server, then the client opens a Web browser, and directs the Web browser to the forms URI to complete a forms-based authentication process.

17 Claims, 6 Drawing Sheets

(56) References Cited

U.S. PATENT DOCUMENTS

2014/0289838 A1     9/2014   Gupta et al.
2014/0337954 A1*   11/2014   Ahmed .................. G06F 21/41
                                                                                                726/8

OTHER PUBLICATIONS

Cesare Pautasso, et al.; "Restful Web Services vs. "Big" Web Services: Making the Right Architectural Decision"; International World Wide Web Conference Committee (IW3C2); WWW 2008; Apr. 21-25, 2008; Beijing, China; 10 pages.

International Search Report and the Written Opinion of the International Searching Authority, or the Declaration for International Application No. PCT/US2016/019853, mailed from the European Patent Office on May 13, 2016, 14 pages.

"POST (HTTP)" <<https://en.wikipedia.org/w/index.php?title=POST_(HTTP)&oldid=639086035>> Dec. 21, 2014, Wikipedia, Retrieved on May 3, 2016, 2 pages.

* cited by examiner

AUTHENTICATION MECHANISM FOR DOMAIN REDIRECTION OF A REPRESENTATIONAL STATE TRANSFER (REST)-COMPLIANT CLIENT

BACKGROUND

As it is generally known, when a Web browser issues a request to a server using the Hyper-Text Transfer Protocol (HTTP), the server may respond by telling the Web browser to issue the request to a different server by returning an HTTP response with the HTTP response status code 302 Found. The HTTP response 302 Found response provides an existing mechanism for performing Uniform Resource Locator (URL) redirection. The HTTP 302 Found response includes a new URL in a Location header field, and instructs the Web browser to perform a second, otherwise identical, request to the new URL.

The new URL may indicate a server located in a different authentication domain from the initial server. Accordingly, when the Web browser attempts to perform the request using the new URL contained in the header of the HTTP 302 Found response, the server associated with the new URL may reject the request, for example by sending an HTTP 401 Unauthorized response. The HTTP 401 Unauthorized response is a form of authentication challenge that requires the Web browser to provide appropriate credentials in order for the request to be completed through the server associated with the new URL.

SUMMARY

Existing mechanisms that support transitioning a Web browser between different authentication domains have been found to be ineffective for use by certain non-Web browser client systems. For example, some non-Web browser clients designed to be compliant with the Representational State Transfer (REST) software architecture style work within a client-server application model in which an application programming interface (API) server is used that does not send HyperText Markup Language (HTML) data to the client. Such clients accordingly do not include the ability to process and render HTML data. Accordingly, these clients are not designed to handle a situation in which they are redirected from their original API server to a new server, and the new server requires authentication using a forms-based authentication protocol, in which the server sends the client HTML to be rendered to a user of the client. For example, if a REST-compliant ("RESTful") non-Web Browser client expects to receive server messages containing documents made up of, for example, eXtensible Markup Language (XML), JavaScript Object Notation (JSON), or some other non-HTML contents, such a client would fail if it were redirected from its original API server to a new server that requires forms based authentication, and that responds to a redirected request with one or more HTML forms through which credentials are to be obtained from a user.

To address these and other shortcomings of previous systems, a new system for domain redirection of a Representational State Transfer (REST)-compliant client is disclosed. The disclosed system supports forms-based authentication for clients that lack the capability to process HTML. In the disclosed system, when an initial server receives a request from a client system that must be redirected, the initial server responds with a redirection object that describes the other server to which the client should re-submit the request, and that also provides additional information about the other server that is obtained from a directory or the like stored in the initial server. The directory on the initial server maintains information about the other server related to how the client may need to authenticate prior to re-submitting the original request to the other server. For example, the redirection object may include a session check variable indicating whether a forms-based authentication process may need to be performed in order to re-submit the request. The redirection object may further include a session uniform resource identifier (URI) to which the client may issue a request to determine whether the client was previously authenticated to the other server. If the client was previously authenticated to the other server, then a session already exists between the client and the other server and no further authentication will be required.

In the case where the session check variable indicates that the other server may possibly require forms based authentication, the client issues a request to the session URI to determine whether an authenticated session already exists between the client and the other server. If an authenticated session does not already exist between the client and the other server, then the client checks to see whether it has a forms URI for the other server through which the client must initiate a forms-based authentication process. The forms URI may, for example, be included in the redirection object from the initial server. If the session check variable indicates that the other server may possibly require forms based authentication, and an authenticated session does not already exist between the client and the other server, and the client has a forms URI for the other server, then the client opens a separate window that has an HTML parser, e.g. a Web browser, and directs the Web browser to the forms URI. After the Web browser completes the forms-based authentication process for the other server, it passes a code to the client. The client then passes the code from the Web browser to a token URI (e.g. also contained the redirection object) to obtain an authentication cookie allowing the client to re-submit the original request to the other server indicated in the redirection object received from the initial server.

Advantageously, and in contrast to previous systems, the disclosed system enables a non-Web browser client to effectively transition among different authentication domains, including authentication domains requiring forms-based authentication. The disclosed system is applicable to non-Web browser clients that are designed to be compliant with the Representational State Transfer (REST) software architecture style ("RESTful" clients), and that are designed to work within a client-server application model in which an application programming interface (API) server is used that does not send HyperText Markup Language (HTML) data to the client. The disclosed system provides such clients with the ability to handle a situation in which they are redirected from their original API server to a new server, and the new server requires authentication using a forms-based authentication protocol, in which the new server sends the client HTML to be rendered to a user of the client.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

A system for domain redirection of a Representational State Transfer (REST)-compliant client is disclosed. The disclosed system supports forms-based authentication for clients that lack the capability to process HTML. In the disclosed system, when an initial server receives a request from a client system that must be redirected, the initial server responds with a redirection object that describes the other server to which the client should re-submit the request, and that also provides additional information about the other server that is obtained from a directory or the like stored in the initial server. The directory on the initial server maintains information about the other server related to how the client may need to authenticate prior to re-submitting the original request to the other server. For example, the redirection object may include a session check variable indicating whether a forms-based authentication process may need to be performed in order to re-submit the request. The redirection object may further include a session uniform resource identifier (URI) to which the client may issue a request to determine whether the client was previously authenticated to the other server. If the client was previously authenticated to the other server, then a session already exists between the client and the other server and no further authentication will be required.

In the case where the session check variable indicates that the other server may possibly require forms based authentication, the client issues a request to the session URI to determine whether an authenticated session already exists between the client and the other server. If an authenticated session does not already exist between the client and the other server, then the client checks to see whether it has a forms URI for the other server through which the client must initiate a forms-based authentication process. The forms URI may, for example, be included in the redirection object from the initial server. If the session check variable indicates that the other server may possibly require forms based authentication, and an authenticated session does not already exist between the client and the other server, and the client has a forms URI for the other server, then the client opens a separate window that has an HTML parser, e.g. a Web browser, and directs the Web browser to the forms URI. After the Web browser completes the forms-based authentication process for the other server, it passes a code to the client. The client then passes the code from the Web browser to a token URI (e.g. also contained the redirection object) to obtain an authentication cookie allowing the client to re-submit the original request to the other server indicated in the redirection object received from the initial server.

Figure 1:
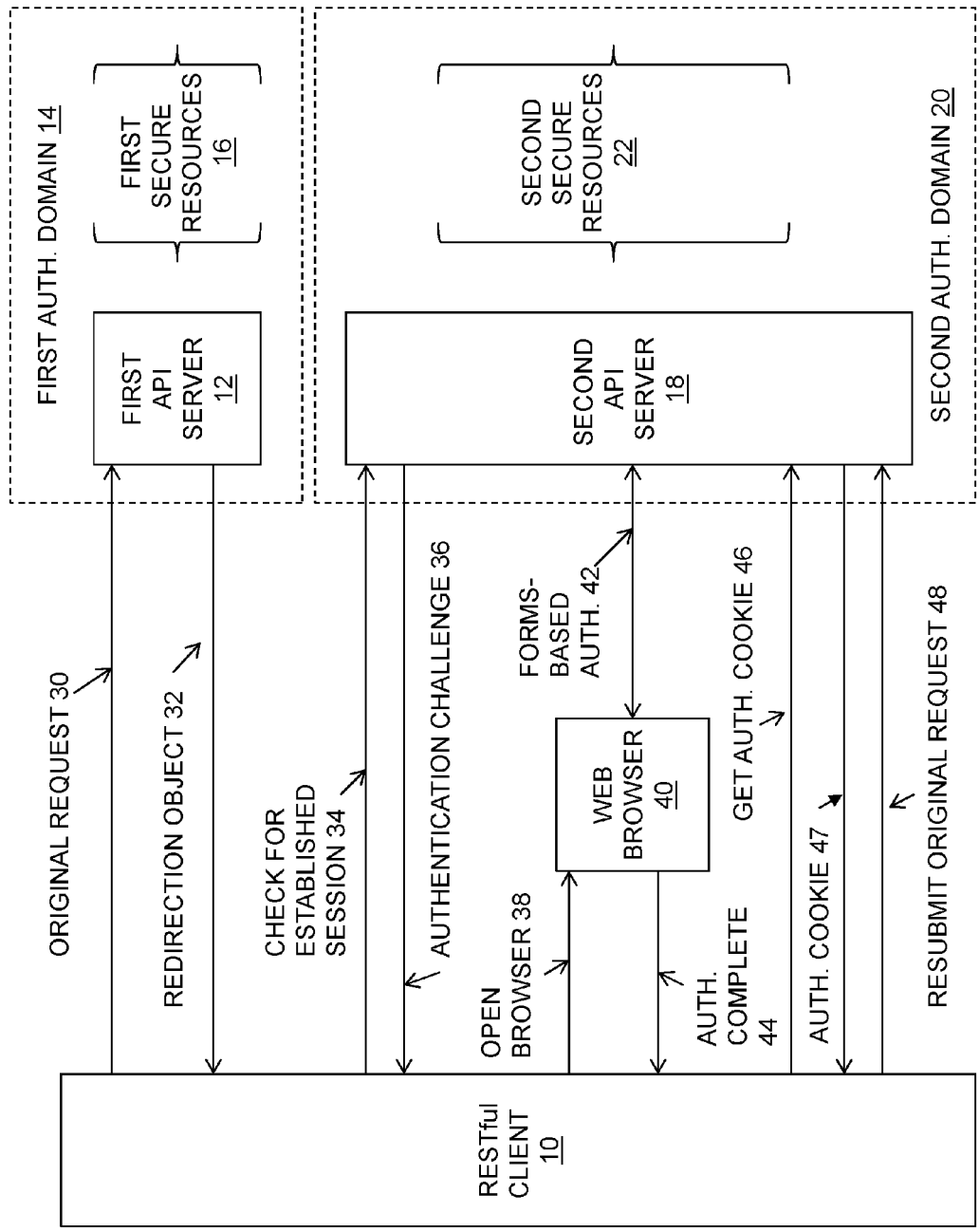
FIG. 1 is a block diagram showing components in an illustrative embodiment of the disclosed system.

FIG. 1 is a block diagram showing components in an illustrative embodiment of the disclosed system. During operation of the components shown in FIG. 1, a RESTful Client 10 transmits an Original Request 30 to a First API Server 12 in a First Authentication Domain 14. The Original Request 30 may, for example, be a request to obtain information regarding resources located in a Second Authentication Domain 20. For example, the Original Request 30 may be a request to obtain information regarding one or more files located in the Second Authentication Domain 20, e.g. within the Second Secure Resources 22.

The Original Request 30 may be any specific kind of message, using any specific type of protocol. In one embodiment, the Original Request 30 is an HTTP request having an HTTP method, a uniform resource locator (URL) indicating the First API Server 12, and a body. In such an embodiment, the HTTP method in the Original Request 30 may be any specific HTTP request method, including but not limited to GET, POST, HEAD, PUT, DELETE, OPTIONS, or CONNECT. The body included in the HTTP request may be any specific body data appropriate for communicating the desired action to be performed in response to the Original Request 30. For example, the body may include or consist of a JavaScript Object Notation (JSON) or eXtensible Markup Language (XML) document.

When the First API Server 12 receives the Original Request 30, the First API Server 12 parses the Original Request 30 to determine whether the First API Server 12 can respond to the Original Request 30 completely based on First Secure Resources 16. For example, if the Original Request 30 is a request for a listing of documents that are contained within the First Secure Resources 16, then First API Server 12 determines that it can respond to the Original Request 30 based on the contents of First Secure Resources 16, and accordingly generates and transmits a response to the RESTful Client 10 without performing any redirection.

Otherwise, if the First API Server 12 determines by parsing the Original Request 30 that it cannot respond to the Original Request 30 completely based on the contents of First Secure Resources 16, then First API Server 12 generates a Redirection Object 32 to be transmitted from the First API Server 12 to the RESTful Client 10. For example, if the First API Server 12 determines from parsing the Original Request 30 that Original Request 30 is a request for a listing of files contained in Second Secure Resources 22, then First API Server 12 would accordingly generate a Redirection Object 32 to be used by RESTful Client 10 in order to contact Second API Server 18. First API Server 12 may determine that it cannot respond completely to Original Request 30 at least in part by locating, while parsing the contents of the Original Request 30, at least one indication (e.g. a URL) of a location within an authentication domain other than the First Authentication Domain 14. In the example of FIG. 1, Original Request 30 includes a URL indicating a location within Second Authentication Domain 20 where one or more files are stored, and which must be accessed in order to complete Original Request 30, and First API Server 12 accordingly must generate Redirection Object 32 to send to RESTful Client 10.

The First API Server 12 generates the Redirection Object 32 using information in a data store describing various authentication domains, e.g. one or more authentication domains other than First Authentication Domain 14. For example, First API Server 12 may maintain a directory of entries, where each directory entry includes one or more fields having contents describing attributes of a corresponding authentication domain. In one embodiment, each directory entry includes the following for a corresponding authentication domain:

i) a location (e.g. an "API Server" Uniform Resource Identifier (URI)) of an API server in the authentication domain, to which requests for resources and/or information about resources located in the authentication domain are to be directed, ii) an indication (e.g. a "SessionCheck" flag) of whether forms-based authentication may be required to access resources in the authentication domain, iii) a location (e.g. a "SessionURI" URI) within the authentication domain to which requests can be directed to determine whether an authenticated session currently exists, iv) a location (e.g. a "FormsURI" URI) within the authentication domain to which requests can be directed for forms-based authentication, and v) a location (e.g. a "TokenURI" URI) within the authentication domain to which requests can be directed to obtain an authentication cookie using an authentication code indicating authentication has been performed.

In the example of FIG. 1, in order to generate the Redirection Object 32, the First API Server 12 finds the entry in the directory corresponding to Second Authentication Domain 20, since Second Authentication Domain 20 is the authentication domain that must be contacted by RESTful Client 10 in order to complete the Original Request 30. The First API Server 12 then loads portions of the directory entry corresponding to Second Authentication Domain 20 into corresponding components of the Redirection Object 32. The First API Server 12 also stores the following into the Redirection Object 32:

i) a copy of the method from the Original Request 30, ii) a copy of the body from the Original Request 30, and iii) any additional context information (e.g. a "ROOT" component) that may be needed by the API server in the authentication domain containing resources relevant to processing the Original Request 30 to map re-submitted Original Request 30 to specific resources located in that authentication domain.

The First API Server 12 then transmits the Redirection Object 32 to the RESTful Client 10. The RESTful Client 10 processes the Redirection Object 32 by first checking whether the SessionCheck flag indicates that forms-based authentication may be required (e.g. SessionCheck=TRUE). If the SessionCheck flag indicates that forms-based authentication may be required, the RESTful Client 10 transmits a Check for Established Session 34 to the SessionURI URI. For example, RESTful Client 10 may check for an established authentication session by transmitting an HTTP GET request message to the URI contained in the SessionURI component of the Redirection Object 32. If an authenticated session with Second API Server 18 currently exists, the existence of the previously established session is confirmed by Second API Server 18, and RESTful Client 10 next resubmits the original request, to the API Server URI, using the copies of the request method and request body stored in the Redirection Object 32 by the First API Sever 12.

Otherwise, if a previously established authentication session does not exist with Second API Server 18, Second API Server 18 will respond to Check for Established Session 34 with Authentication Challenge 36 (e.g. HTTP 401—Unauthorized). RESTful Client 10 responds to receipt of Authentication Challenge 36 by checking whether the FormsURI component of the Redirection Object 32 is populated with a URI. If the FormsURI component of the Redirection Object 32 is not populated, then RESTful Client 10 authenticates to Second API Server 18 using an authentication protocol other than forms-based authentication. Otherwise, if the FormsURI component of the Redirection Object 32 contains a URI, then at reference number 38 RESTful Client 10 opens a Web browser 40, and directs ("navigates") the Web browser 40 to the URI contained in the FormsURI component of the Redirection Object 32. Alternatively, the RESTful Client 10 may navigate the Web Browser 40 to a URI extracted from a "Forms" variable contained in the Authentication Challenge 36 received from the Second API Server 18.

The Web browser 40 then completes a Forms-Based Authentication process 42 with Second API Server 18. The Web browser 40 is able to interpret and render any HTML received during the Forms-Based Authentication process 42. For example, the Web browser 40 may receive and render in a display device one or more HTML forms through which a user enters one or more authentication credentials (e.g. user name, password, etc.), and then pass the credentials received from the user to Second API Server 18 to establish an authenticated session.

At the end of the Forms-Based Authentication process 42, an Authentication Complete code 44 is received from the Second API Server 18 and passed to the RESTful Client 10. In one embodiment, while performing Forms Based Authentication 42, the Web browser 40 may issue an HTTP GET request to the URI from the FormsURI component of the Redirection Object 32 (or to the Forms URI from the Authentication Challenge 36). The Web browser 40 may include a parameter with the GET request, where the parameter is a redirect URL associated with RESTful Client 10. The redirect URL in the GET request causes the Second API Server 18, after the authentication session has been established, to pass a completion code (Authentication Complete code 44) back to the RESTful Client 10, thus informing the RESTful Client 10 that authentication has completed.

The RESTful Client 10 then transmits a Get Authentication Cookie message 46 to the URI contained in the TokenURI component of the Redirection Object 32. The Get Authentication Cookie message 46 may, for example, be an HTTP GET request issued by the RESTful Client 10 to the URI contained in the TokenURI component of the Redirection Object 32. Alternatively, the Get Authentication Cookie message 46 may be an HTTP GET request issued by the RESTful Client 10 to a URI extracted from a "Token" variable contained in the Authentication Challenge 36 received from the Second API Server 18. The Second API Server 18 responds to the RESTful Client 10 with an Authentication Cookie 47 representing the authenticated session between the RESTful Client 10 and the Second API Server 18.

The RESTful Client 10 then transmits Resubmit of Original Request 48 to Second API Server 18. For example, the RESTful Client 10 generates an HTTP request, and transmits the HTTP request to the Second API Server 18. The RESTful Client 10 generates the HTTP request, for example, by loading the URI from the API Server component of the Redirection Object 32 into the HTTP request, and loading the copy of the method from the Original Request 30 from the Redirection Object 32 into the HTTP request, and loading the copy of the body of the Original Request 30 from the Redirection Object 32 into the HTTP request.

While for purposes of concise illustration only two authentication domains are shown in FIG. 1, those skilled in the art will recognize that the disclosed system is not so limited.

Accordingly, the disclosed system may be embodied and operated such that any specific number of different authentication domains are supported.

Those skilled in the art will recognize that RESTful Client 10 may be embodied as a software application client executing on a client computer system. Such a client computer system, and the API Servers 12 and 18 shown in FIG. 1 may, for example, each be embodied as computer systems having processing circuitry (e.g. one or more processors), memory and/or other program storage, and one or more input/output interfaces. The operations described herein may be embodied in such computer systems using software, firmware, dedicated hardware circuitry, and/or some combination thereof. Similarly, those skilled in the art will recognize that one or more of the API Servers 12 and 18 shown in FIG. 1 may be embodied as, including, or within one or more virtual machines or the like.

Communication between the RESTful Client 10 and the API Servers 12 and 18 shown in FIG. 1 may be provided over one or more computer or other type of communication networks, such as, for example, one or more local area networks (LANs), wide area networks (WANs), and/or the Internet. Communication between the RESTful Client 10 and the API Servers 12 and 18 may use various specific communication protocols, including but not limited to the Hypertext Transfer Protocol (HTTP).

Figure 2:
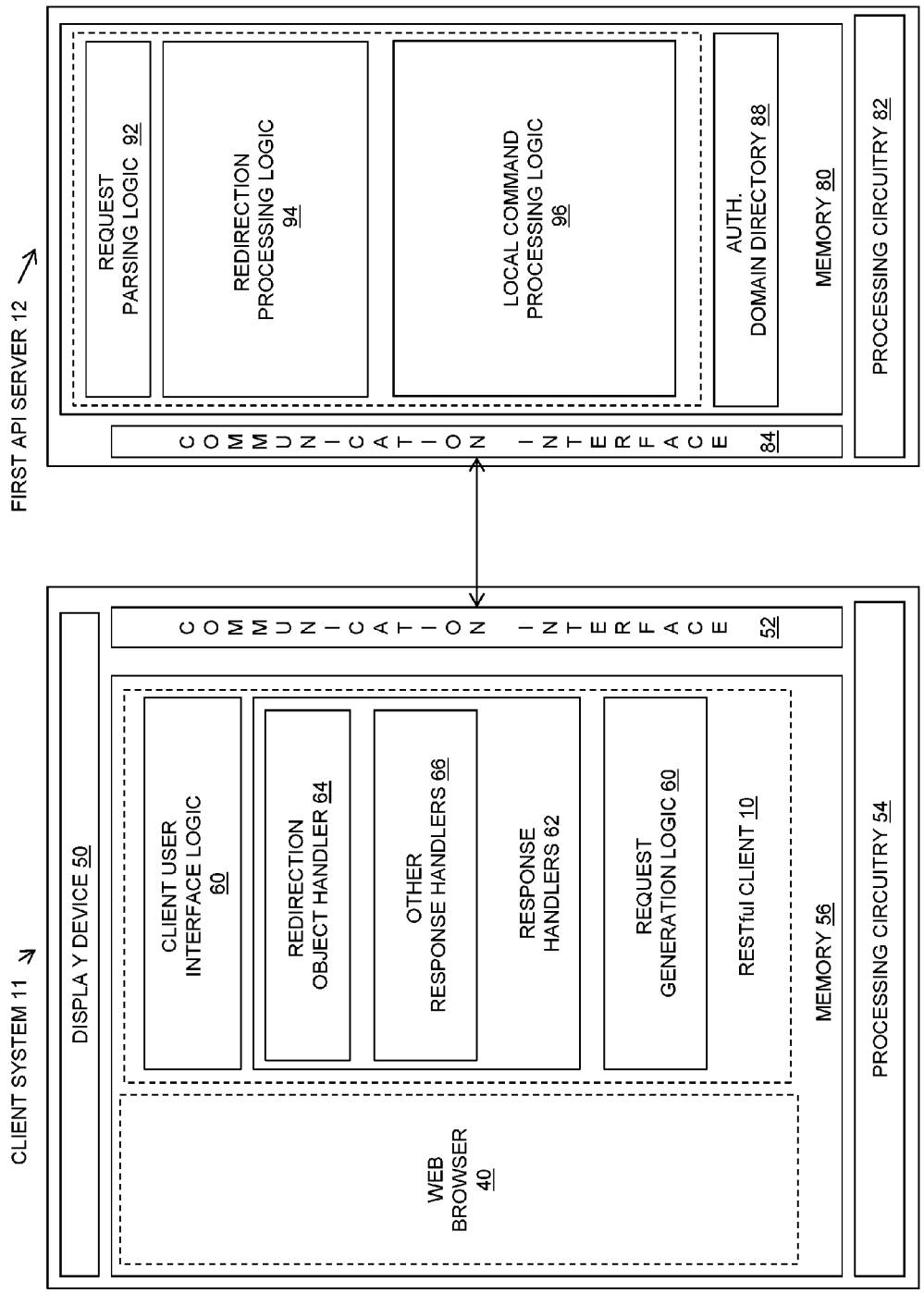
FIG. 2 is a block diagram showing the structure of a client system and a first application programming interface (API) server in an illustrative embodiment of the disclosed system.

FIG. 2 is a block diagram showing the structure of a Client System 11 and a First Application Programming Interface (API) Server 12 in an illustrative embodiment of the disclosed system. As shown in the embodiment of FIG. 2, Client System 11 includes Display Device 50, Communication Interface 52, Processing Circuitry 54, and a program storage shown as Memory 56. Display Device 50 may include or consist of any specific type of output device operable to present information in visual form. Communication Interface 52 may, for example, include or consist of one or more network interface cards (NICs) or the like. Processing Circuitry 54 may, for example, include or consist of one or more microprocessors or the like. Memory 56 may, for example, include or consist of any specific type of volatile or non-volatile semiconductor memory or the like that is operable to store programs (sequences of instructions) and/or data (e.g. program state information) for use in the Client System 11.

The Memory 56 stores program logic for execution on the Processing Circuitry 54. In the embodiment of FIG. 2, Memory 56 includes REST compliant client application software, shown as RESTful Client 10. RESTful Client 10 includes Client User Interface Logic 60 for providing at least a portion of a graphical user interface to a user of Client System 11 within the Display Device 50. Within RESTful Client 10, Request Generation Logic 60 includes program code for generating requested operations, including the Original Request 30 (FIG. 1). Response Handlers 62 includes a number of response handler program code modules, which are responsible for handling messages (e.g. responses) received by Client System 11 for the RESTful Client 58 through the Communication Interface 52. Accordingly, when the Client System 10 receives a response for RESTful Client 10, (e.g. Redirection Object 32), RESTful Client 10 determines whether the response is an actual response to a previous request, or a redirection object. In the case where the received response is or includes a redirection object, the received response is passed to the Redirection Object Handler 64 for processing. Other responses received by Client System 11 for RESTful Client 10 are processed by the Other Response Handlers 66.

Further in the illustrative embodiment of FIG. 2, Initial API Server 12 includes Communication Interface 84, Processing Circuitry 82, and program storage shown as Memory 80. Communication Interface 84 may, for example, include or consist of one or more network interface cards (NICs) or the like. Processing Circuitry 82 may, for example, include or consist of one or more microprocessors or the like. Memory 80 may, for example, include or consist of any specific type of volatile or non-volatile semiconductor memory or the like that is operable to store programs (sequences of instructions) and/or data (e.g. program state information) for use in the Initial API Server 12.

The Memory 80 shown in FIG. 2 stores program logic for execution on the Processing Circuitry 82, shown as the Request Parsing Logic 92, Redirection Processing Logic 94, and Local Command Processing Logic 96. The Memory 80 also includes an Authentication Domain Directory 88.

When a request (e.g. Original Request 30 in FIG. 1) is received by the Initial API Server 12 through the Communication Interface 84, the request is passed to the Request Parsing Logic 92. The Request and Command Parsing Logic 92 determines whether the request is directed to one or more resources located in one or more authentication domains other than the local authentication domain (e.g. other than the Initial Authentication Domain 14 in FIG. 1). If so, then the request is passed to Redirection Processing Logic 94 for processing. Otherwise, in the case where the received request operation can be completed using resources contained within the local authentication domain (e.g. contained within Initial Authentication Domain in FIG. 1), then the request is passed to Local Command Processing Logic 96.

For example, the Request Parsing Logic 92 may examine the contents of a received request to determine whether the request indicates resources contained outside the local authentication domain. Such indications may, for example, include one or more names, paths, or URLs specifying files or file locations contained in authentication domains other than the local authentication domain. If the received request indicates resources contained outside the local authentication domain, then the received request operation is passed to Redirection Processing Logic 94. Redirection Processing Logic 94 then generates a redirection object in the Memory 80, based on information stored in the Authentication Domain Directory 88 describing the authentication domain to which the request is to be redirected. Redirection Processing Logic 94 then transmits the redirection object to Client System 11.

When the redirection object is received by Client System 11, RESTful Client 10 passes the redirection object to Redirection Object Handler 64 for processing. Redirection Object Handler 64 determines, based on the contents of the redirection object, whether forms-based authentication may be required in order to re-submit the original request to a different API server (e.g. to Second API Server 18 in FIG. 1). If Redirection Object Handler 64 determines that such forms-based authentication may be required, it transmits an inquiry to the API server indicated in the redirection object to determine whether an authenticated session currently exists with that server. If not, and if an authentication challenge is received by Client System 11 from the API server indicated in the redirection object, then Redirection Object Handler 64 checks whether the redirection object includes a URL through which a forms-based authentication process is to be performed. If the redirection object includes a URL through which forms-based authentication is to be performed, RESTful Client 10 opens the Web browser 40, and navigates the Web browser 40 to the URL through which a forms-based authentication process is to be performed. Forms-based authentication is then performed between the Web browser 40 and the API server indicated by the redirection object. The Web Browser 40 processes any HTML received during the forms-based authentication process, and renders any HTML forms onto the Display Device 50 for a user of Client System 11, so that the user can enter any credentials required to complete the authentication process.

When the forms-based authentication process is complete, a completion code received from the API server indicated by the redirection object is passed to the RESTful Client 10, and the RESTful Client 10 may then issue a request to the API server indicated by the redirection object for an authentication cookie representing the authenticated session. For example, the RESTful Client 10 may issue the token request to a URL contained in the redirection object indicating a location to which tokens requests are to be sent with respect to the API server indicated in the redirection object. After the token is received for the authenticated session, the Redirection Object Handler 64 re-submits the original request using a method and body of the original request stored in the redirection object, and the URL of the API Server contained in the redirection object.

Figure 3:
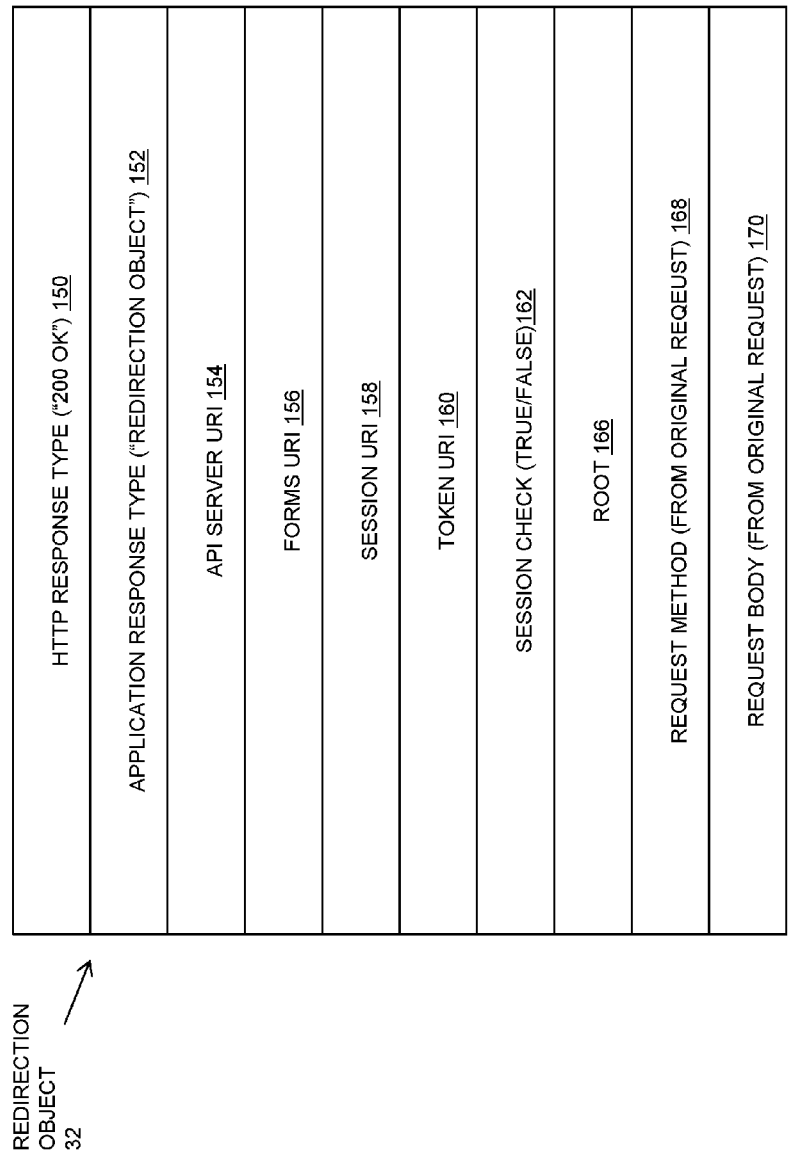
FIG. 3 is a block diagram showing an example of at least a portion of the structure of a redirection object generated by and transmitted from the first application programming interface (API) server in an illustrative embodiment of the disclosed system.

FIG. 3 is a block diagram showing components in at least a portion of the structure of a Redirection Object 32, as generated by and transmitted from a first application programming interface (API) server (e.g. First API Server 12 in FIG. 1). For example, the Redirection Object 32 may include or consist of a JavaScript Object Notation (JSON) document, an eXtensible Markup Language (XML) document, or some other specific type of response representation format.

As shown in FIG. 3, Redirection Object 32 may include an HTTP Response Type component 150. HTTP Response Type 150 may, for example, have value equal to the HTTP response code 200 OK. An Application Response Type component 152 may store a value or code indicating that the Redirection Object 32 is not a final response to the corresponding request, but instead a redirection object that should be processed, for example, by the Redirection Object Handler 64 (FIG. 2). An API Server URI component 154 stores a URI of an API Server in the authentication domain to which the original request is being redirected. For example, in the example of FIG. 1, API Server URI 154 would store a URI of the Second API Server 18. A Forms URI component 156 stores a URI through which the receiving client system can perform a forms-based authentication process, if needed, prior to resubmitting the original request to the server indicated by the API Server URI component 154.

A Session URI component 158 stores a URI through which the receiving client can determine whether an authenticated session has been previously established with the server indicated by the API Server URI component 154. A Token URI component 160 stores a URI through which the receiving client can obtain an authentication cookie with respect to the server indicated by the API Server URI component 154. A Session Check flag 162 indicates whether forms-based authentication may be required prior to re-submitting the original request to the server indicated by the API Server URI component 154. For example, Session Check flag 162 may be set to TRUE to indicate that forms-based authentication may be required, and to FALSE to indicate that forms-based authentication will not be required prior to re-submitting the original request to the server indicated by the API Server URI component 154. A Root component 166 stores context information regarding the resources referred to by the original request. For example, the contents of Root component 166 may be provided by the First API Server 12 (FIG. 1), and passed by the RESTful Client 10 to the Second API Server 18 to indicate a context for the resubmitted request, e.g. help the Second API Server 18 identify the specific resources within Second Authentication Domain 20 to which the re-submitted request should be applied.

The Request Method component 168 stores the method from the original request received, for example, by the First API Server 12 (FIG. 1), and the Request Body component 170 stores the body from the original request.

Figure 4:
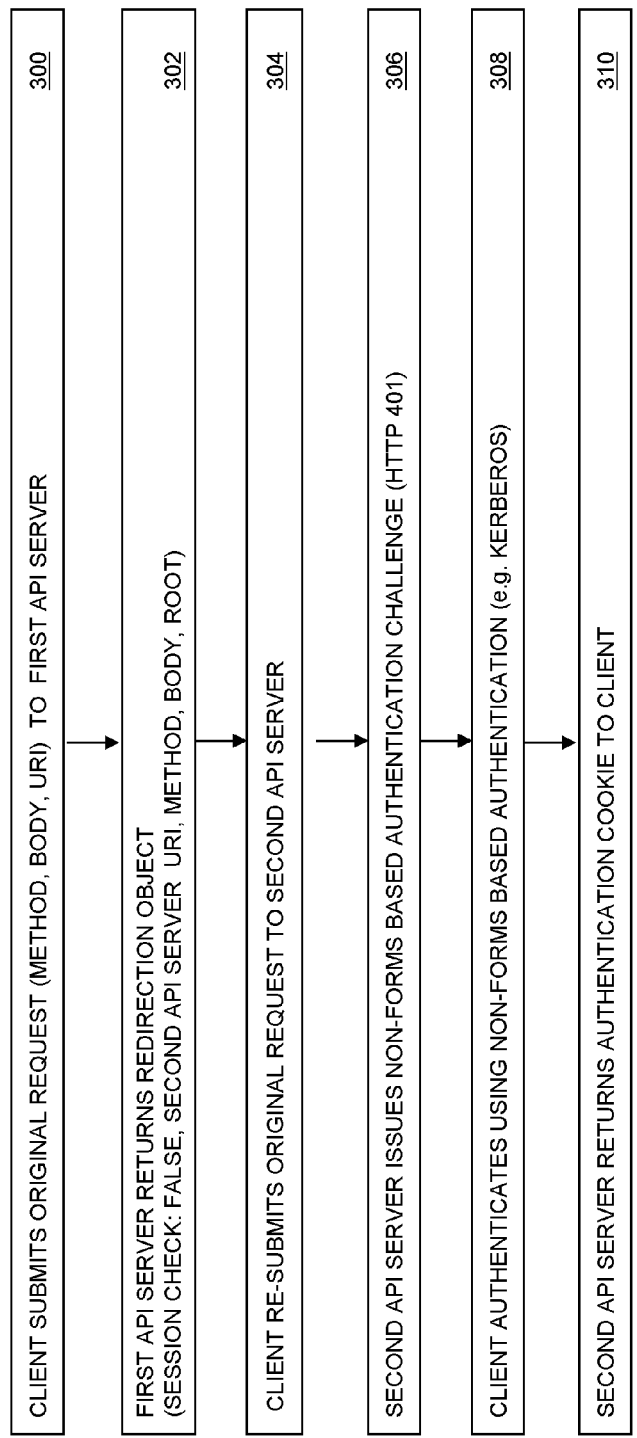
FIG. 4 is a flow diagram showing an example of steps performed by a client system, including steps performed to process a redirection object having a session check value of "False"

FIG. 4 is a flow diagram showing an example of steps performed by a client system, including steps to process a redirection object having a session check value of "False". At step 300, the client submits an original request for a first API server. At step 302, the first API server determines that the request relates to resources outside of the authentication domain of the first API server, and accordingly generates a redirection object, and transmits the redirection object to the client system. The redirection object generated and transmitted by the first API server in the example of FIG. 4 has a Session Check flag equal to FALSE, and includes an API Server URI component equal to a URI of an API server to which the request is to be redirected (e.g. of Second API Server A 18 in FIG. 1), a Request Method component equal to a copy of the method from the original request, and a Request Body component equal to a copy of the body of the original request, and a Root component storing context information provided by the first API server for use by the API Server indicated by the URI stored in the API Server URI component, to determine the specific resources to be used to complete the request. When the client system processes the redirection object returned at step 302, the client system finds the value of Session Check is FALSE. Based on this flag setting, the client system processes the received redirection object without starting up a Web browser to handle HTML transmitted from the API Server indicated by the URI stored in the API Server URI component. The Session Check value of FALSE indicates that no forms-based authentication will be required prior to re-submitting the original request to the API Server indicated by the URI stored in the API Server URI component, and accordingly the client system also need not perform any checking as to whether an authenticated session has been previously established with respect to the API Server indicated by the URI stored in the API Server URI component. Instead, after step 302, at step 304 the client system resubmits the original request to the API Server indicated by the URI stored in the API Server URI component of the redirection object. In the case where the API Server indicated by the URI stored in the API Server URI component of the redirection object responds to the resubmission performed at step 304 with an authentication challenge at step 306, the client system knows that forms-based authentication will not be required, and the client successfully authenticates using a non-forms based authentication process (e.g. Kerberos, HTTP Basic authentication, NT LAN Manager (NTLM), etc.). After the non-forms based authentication is complete, at step 310 the API Server indicated by the URI stored in the API Server URI component of the redirection object returns an authentication cookie to the client system, and the client system can then repeat step 304 without failing due to lack of authentication.

Figure 5:
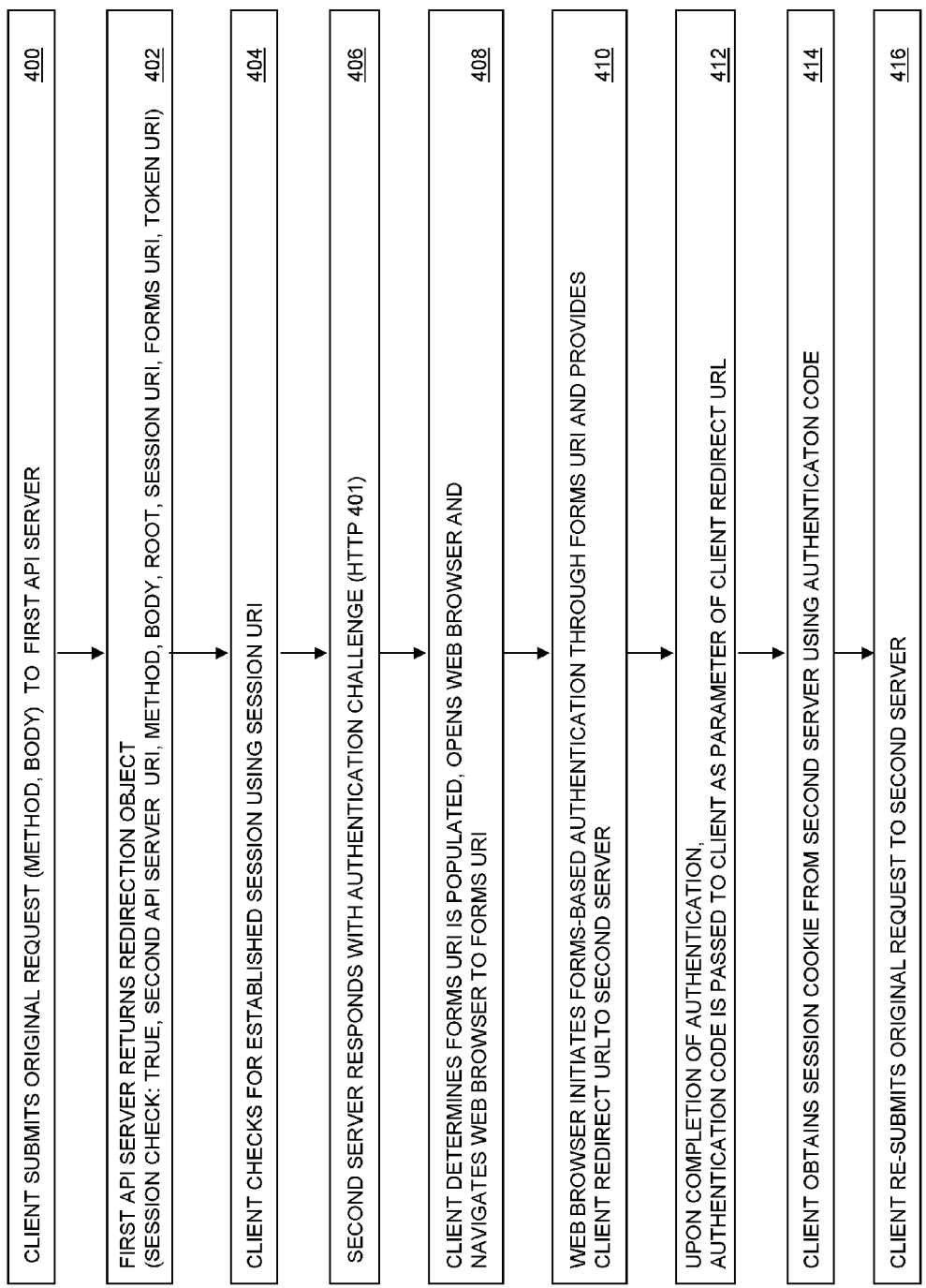
FIG. 5 is a flow diagram showing an example of steps performed by a client system, including steps performed to process a redirection object having a session check value of "True"

FIG. 5 is a flow diagram showing an example of steps performed by a client system, including steps to process a redirection object having a session check value of "True". At step 400, the client system transmits an original request to a first API server (e.g. First API Server 12 in FIG. 1), in a first authentication domain (e.g. First Authentication Domain 14). The first API server receives the original request, and determines that the request relates to resources outside of the authentication domain of the first API server. The first API server accordingly generates a redirection object, and transmits the redirection object to the client system. The redirection object generated and transmitted by the first API server in the example of FIG. 5 has a Session Check flag equal to TRUE, and includes an API Server URI component equal to a URI of an API server to which the request is to be redirected (e.g. of Second API Server A 18 in FIG. 1), a Request Method component equal to a copy of the method from the original request, a Request Body component equal to a copy of the body of the original request, and a Root component storing context information provided by the first API server for use by the API Server indicated by the URI stored in the API Server URI component, to determine the specific resources to be used to complete the request. In the example of FIG. 5, the redirection object generated and transmitted by the first API server further includes i) a SessionURI component storing a location (e.g. a URI) within the second authentication domain, to which requests can be directed to determine whether an authenticated session currently exists, ii) a FormsURI component storing a location (e.g. a URI) within the second authentication domain, to which requests can be directed for forms-based authentication, and iii) a TokenURI component storing a location (e.g. a URI) within the second authentication domain, to which requests can be directed to obtain an authentication cookie using an authentication code indicating authentication has been performed. The first API server transmits the redirection object to the client system at step 402.

The client system receives the redirection object, and reads the value of TRUE stored in the Session Check flag. In response to finding that the Session Check has a value of TRUE, the client system knows that forms-based authentication may be required, and at step 404 checks for a previously established authentication session using the URI stored in the SessionURI component. At step 406, because no authentication session has been previously established, the client system receives an authentication challenge in response to the check performed at step 404. For example, at step 406 the client system receives an authentication challenge consisting of an HTTP 401 Unauthorized response.

In response to receiving the authentication challenge at step 406, the client system checks whether the FormsURI component is populated (i.e. whether FormsURI stores a URI). In this case, the client system determines that FormsURI contains a URI. In response to determining that FormsURI contains a URI, at step 408 the client system opens a Web browser, and navigates the Web browser to the URI contained in the FormsURI component of the redirection object. The Web browser initiates forms-based authentication through the URI from the FormsURI component of the redirection object at step 410. To initiate forms-based authentication, the Web browser 40 may issue an HTTP GET request to the URI from the FormsURI component, and include a parameter with the GET request that is a redirect URL associated with client system. The redirect URL in the GET request causes the second API Server, when the authentication session has been established, to pass a completion code back to the client system to inform the client system that authentication has completed at step 412.

Advantageously, the Web browser interprets and renders any HTML received during the forms-based authentication process. For example, the Web browser may receive and render in a display device one or more HTML forms through which a user enters one or more authentication credentials.

At step 414, the client system obtains an authentication cookie by sending a request to the URI contained in the TokenURI component of the redirection object, together with the code received upon completion of the authentication process. When the client system receives the authentication cookie, the client system re-submits the original request at step 416. For example, the client system may re-submit the original request at step 416 by generating an HTTP request at least in part by loading the URI from the API Server component of the redirection into the HTTP request, and loading the contents of the Request Method component and Request Body component into the HTTP request, prior to transmitting the HTTP request at step 416.

Figure 6:
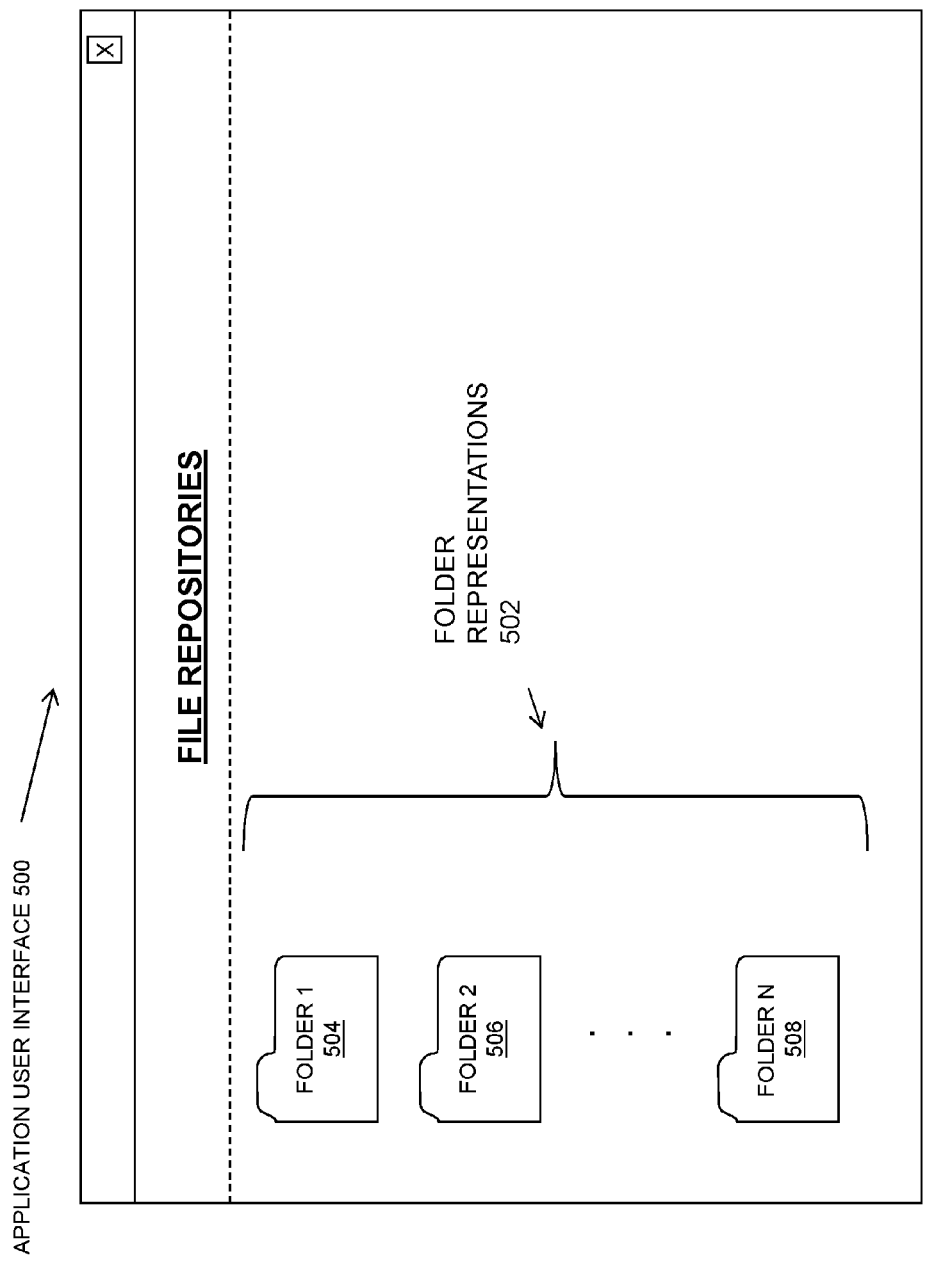
FIG. 6 is a simplified screenshot showing features in a portion of a graphical user interface generated by an illustrative embodiment of the disclosed system, enabling a user to navigate files contained in multiple authentication domains.

FIG. 6 is a simplified screenshot showing features in a portion of a graphical user interface generated by an illustrative embodiment of the disclosed system, enabling a user to navigate files contained in multiple authentication domains. The Application User Interface 500 shown in FIG. 6 may, for example, be displayed to a user of Client System 11 (FIG. 2), by Client User Interface Logic 60 through the Display Device 50. As shown in FIG. 6, an Application User Interface 500 includes Folder Representations 502, including Folder 1 504, Folder 2, 506, through Folder N 508. Each of the Folder Representations 502 may represent a separate, independent file repository (e.g. a directory of files contained in a file server system or provided through a file sharing service or collaboration application), located in a different authentication domain from all other file repositories. For example, with reference also to FIG. 1, Folder 1 504 may represent a file repository located in First Authentication Domain 14, and Folder 2 506 may represent a file repository located in Second Authentication Domain 20. A user of Client System 11 may accordingly select the file repository located in First Authentication Domain 14 by selecting (e.g. clicking on) Folder 1 504, and/or may select the file repository located in Second Authentication Domain 20 by selecting (e.g. clicking on) Folder 2 506. For example, when the user clicks on Folder 2 506, the RESTful Client 10 in Client System 11 may generate a request for a listing of files contained in the file repository in Second Authentication Domain 20 that is represented by Folder 2 506, so that the file listing can be displayed to the user. The RESTful Client 10 may then transmit the request to First API Server 12. First API Server 12 would then determine that the request must be redirected to Second API Server 18, and generate the appropriate redirection object using information from the original request and from the Authentication Domain Directory 88 (FIG. 2) describing attributes of Second API Server 18 and/or Second Authentication Domain 20. The RESTful Client 10 would then process the redirection object received from First API Server 12 in order to retrieve the file listing for the file repository in Second Authentication Domain 20 that is represented by Folder 2 506.

Those skilled in the art will recognize that the specific user interface objects shown in FIG. 6 (i.e. folders) are provided only for purposes of convenient illustration and explanation, and that the disclosed system is not limited embodiments using those specific user interface objects to represent file repositories located in different authentication domains. Any other appropriate type of user interface object may be used as a functional alternative to the Folder Representations 502. Moreover, the Application User Interface 500 itself is shown in a simplified representation, and various user interface display objects other than the ones shown may be included or added as needed for a specific embodiment.

Thus there is disclosed a new system for domain redirection of a Representational State Transfer (REST)-compliant client that provides significant improvements over previous solutions. The disclosed system advantageously supports forms-based authentication for clients that lack the capability to process HTML. The disclosed system specifically improves over prior approaches by enabling a non-Web browser client to effectively transition among different authentication domains, including authentication domains requiring forms-based authentication. The disclosed system is applicable to non-Web browser clients that are designed to be compliant with the Representational State Transfer (REST) software architecture style ("RESTful" clients), and that are designed to work within a client-server application model in which an application programming interface (API) server is used that does not send HyperText Markup Language (HTML) data to the client. The disclosed system provides such clients with the ability to handle redirections from their original API server to a new server, in which the new server requires authentication using a forms-based authentication protocol, and the new server sends the client HTML to be rendered to a user of the client.

While the above description provides examples of embodiments using various specific terms to indicate specific systems, devices, and/or components, such terms are illustrative only, and are used only for purposes of convenience and concise explanation. The disclosed system is not limited to embodiments including or involving systems, devices and/or components identified by the terms used above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more non-transitory computer readable storage medium(s) having computer readable program code embodied thereon.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The disclosed system can take the form of an entirely software-based embodiment, an entirely hardware-based embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of domain redirection, comprising:
   receiving, at a first server system in a first authentication domain, an original request having a method and a body, the original request transmitted to the first server system in a message from a client program executing on a client system;
   parsing, by the first server system, the received original request, wherein the parsing identifies at least one portion of the original request that requires resources from a second authentication domain, the second authentication domain separate from the first authentication domain;
   generating, by the first server system in response to the parsing identifying the portion of the original request that requires resources from the second authentication domain, in a memory of the first server system, a redirection object, wherein the generating includes storing an identifier of a second server system in the redirection object, the second server system located in the second authentication domain, and storing a session check flag in the redirection object, the session check flag indicating whether the client system may be required to perform forms-based authentication prior to re-submitting the original request to the second server system; and
   transmitting a response containing the redirection object from the first server system to the client system.

2. The method of claim 1, further comprising:
   wherein generating the redirection object by the first server system includes storing a first value in the session check flag, the first value indicating that the client system may be required to perform forms-based authentication prior to resubmitting the original request to the second server system;
   receiving, by the client system, the response containing the redirection object;
   extracting, by the client program, the session check flag from the redirection object;
   opening, on the client system by the client program, in response to finding the first value in the session check flag of the redirection object, a Web browser program; and
   directing, by the client program, the Web browser to perform a forms-based authentication process with regard to the second server system; and receiving, by the client program, a code indicating that the forms-based authentication process is complete; and re-submitting, by the client program in response to receiving the code indicating that the forms-based authentication process is complete, the original request to the second server system.

3. The method of claim 2, further comprising:

wherein generating the redirection object by the first server system further includes storing a session check resource identifier in the redirection object;

extracting, by the client program, the session check resource identifier from the redirection object;

checking, by the client program, whether an authenticated session currently exists between the client system and the second authentication server, by transmitting a session check request message using the session check resource identifier from the redirection object;

receiving, by the client program, in response to the session check request message, an authentication challenge response; and wherein the client program opens the Web browser on the client system only in the event that both the following conditions are met
i) the session check flag of the redirection object stores the first value, and
ii) the client program receives an authentication challenge in response to the session check request message.

4. The method of claim 2, further comprising:

wherein generating the redirection object by the first server system further includes storing a session check resource identifier in the redirection object;

extracting, by the client program, the session check resource identifier from the redirection object;

checking, by the client program, whether an authenticated session currently exists between the client system and the second authentication server, by transmitting a session check request message using the session check resource identifier from the redirection object;

receiving, by the client program, in response to the session check request message, an authentication challenge response;

determining, by the client program, whether the redirection object includes a forms resource identifier indicating a location to which requests for forms-based authentication are to be directed prior to re-submitting the original request to the second server system; and wherein the client program opens the Web browser on the client system only in the event that the following three conditions are all met
i) the session check flag of the redirection object stores the first value,
ii) the client program receives an authentication challenge in response to the session check request message, and
iii) the redirection object includes a forms resource identifier indicating a location to which requests for forms-based authentication are to be directed prior to re-submitting the original request to the second server system.

5. The method of claim 3, further comprising:

wherein generating the redirection object by the first server system further includes storing a forms resource identifier in the redirection object;

extracting, by the client program, the forms resource identifier from the redirection object; and wherein directing the Web browser to perform the forms-based authentication process with regard to the second server includes the client program navigating the Web browser using the forms resource identifier from the redirection object.

6. The method of claim 3, further comprising:

wherein generating the redirection object by the first server system further includes storing a token resource identifier in the redirection object;

extracting, by the client program, the token resource identifier from the redirection object; and obtaining, by the client program prior to re-submitting the original request to the second server system, an authentication cookie representing an authentication session established with regard to the second server through the forms-based authentication process, by transmitting a token request message including the token resource identifier from the redirection object.

7. The method of claim 2, further comprising:

wherein generating the redirection object by the first server system includes extracting a request method from the original request and storing the request method from the original request into a request method component of the redirection object, and extracting a request body from the original request and storing the request body from the original request into a request body component of the redirection object;

extracting, by the client program, the identifier of the second server, the request method component, and the request body component from the redirection object; and wherein resubmitting the original request includes generating and transmitting a request message containing the identifier of the second server system from the redirection object, the request method component from the redirection object, and the request body component from the redirection object.

8. The method of claim 5, further comprising:

maintaining, by the first server system, a directory of entries, each entry corresponding to one of a plurality of authentication domains, wherein each entry includes, with regard to the corresponding one of the authentication domains
i) a location of a server to which requests for resources located in the corresponding authentication domain are to be directed,
ii) an indication of whether forms-based authentication may be required to access resources in the corresponding authentication domain,
iii) a location to which requests to determine whether an authenticated session currently exists with the corresponding authentication domain are to be directed, and
iv) a location to which requests for forms-based authentication in the corresponding authentication domain are to be directed; and wherein generating the redirection object by the first server system is responsive to an entry in the directory corresponding to the second authentication domain.

9. A system for domain redirection, comprising:

a first server system in a first authentication domain, comprising processing circuitry, and memory coupled to the processing circuitry, the memory storing instructions which, when carried out by the processing circuitry, cause the first server system to:

receive an original request having a method and a body, the original request transmitted to the first server system in a message from a client program executing on a client system, parse the received original request, at least in part by identifying at least one portion of the original request that requires resources from a second authentication domain, the second authentication domain separate from the first authentication domain, generate, in response to identifying the portion of the original request that requires resources from the second authentication domain, in a memory of the first server system, a redirection object, at least in part by storing an identifier of a second server system in the redirection object, the second server system located in the second authentication domain, and storing a session check flag in the redirection object, the session check flag indicating whether the client system may be required to perform forms-based authentication prior to re-submitting the original request to the second server system, and transmit a response containing the redirection object from the first server system to the client system.

10. The system of claim 9, further comprising:

wherein the instructions stored in the first server system memory, when carried out by the first server system processing circuitry, cause the first server system to generate the redirection object by further storing a first value in the session check flag, the first value indicating that the client system may be required to perform forms-based authentication prior to resubmitting the original request to the second server system;

wherein the client system comprises processing circuitry and memory coupled to the processing circuitry, the memory storing instructions of the client program which, when carried out by the processing circuitry, cause the client system to receive the message containing the redirection object from the first server system, extract the session check flag from the redirection object, open, on the client system, in response to finding the first value in the session check flag of the redirection object, a Web browser program, direct the Web browser to perform a forms-based authentication process with regard to the second server system, receive a code indicating that the forms-based authentication process is complete, and resubmit, in response to receiving the code indicating that the forms-based authentication process is complete, the original request to the second server system.

11. The system of claim 10, further comprising:

wherein the instructions stored in the server system memory, when carried out by the server system processing circuitry, further cause the server system to generate the redirection object at least in part by storing a session check resource identifier in the redirection object; and wherein the client program instructions stored in the client system memory, when carried out by the client system processing circuitry, further cause the client system to extract the session check resource identifier from the redirection object, check whether an authenticated session currently exists between the client system and the second authentication server by transmitting a session check request message using the session check resource identifier from the redirection object, receive, in response to the session check request message, an authentication challenge response, and open the Web browser on the client system only in the event that both the following conditions are met i) the session check flag of the redirection object stores the first value, and ii) the client program receives an authentication challenge in response to the session check request message.

12. The system of claim 10, further comprising:

wherein the instructions stored in the server system memory, when carried out by the server system processing circuitry, further cause the server system to generate the redirection object at least in part by storing a session check resource identifier in the redirection object; and wherein the client program instructions stored in the client system memory, when carried out by the client system processing circuitry, further cause the client system to extract the session check resource identifier from the redirection object, check whether an authenticated session currently exists between the client system and the second authentication server by transmitting a session check request message using the session check resource identifier from the redirection object, receive, in response to the session check request message, an authentication challenge response, determine whether the redirection object includes a forms resource identifier indicating a location to which requests for forms-based authentication are to be directed prior to re-submitting the original request to the second server system, and open the Web browser on the client system only in the event that the following three conditions are all met i) the session check flag of the redirection object stores the first value, ii) the client program receives an authentication challenge in response to the session check request message, and iii) the redirection object includes a forms resource identifier indicating a location to which requests for forms-based authentication are to be directed prior to re-submitting the original request to the second server system.

13. The system of claim 11, further comprising:

wherein the instructions stored in the server system memory, when carried out by the server system processing circuitry, further cause the server system to generate the redirection object at least in part by storing a forms resource identifier in the redirection object; and wherein the client program instructions stored in the client system memory, when carried out by the client system processing circuitry, further cause the client system to extract the forms resource identifier from the redirection object, and direct the Web browser to perform the forms-based authentication process with regard to the second server further by the client program navigating the Web browser using the forms resource identifier from the redirection object.

14. The system of claim 11, further comprising:

wherein the instructions stored in the server system memory, when carried out by the server system processing circuitry, further cause the server system to generate the redirection object at least in part by storing a token resource identifier in the redirection object; and wherein the client program instructions stored in the client system memory, when carried out by the client system processing circuitry, further cause the client system to extract the token resource identifier from the redirection object, and obtain, prior to re-submitting the original request to the second server system, an authentication cookie representing an authentication session established with regard to the second server through the forms-based authentication process, by transmitting a token request message including the token resource identifier from the redirection object.

15. The system of claim 10, further comprising:

wherein the instructions stored in the server system memory, when carried out by the server system processing circuitry, further cause the server system to generate the redirection object at least in part by extracting a request method from the original request and storing the request method from the original request into a request method component of the redirection object, and extracting a request body from the original request and storing the request body from the original request into a request body component of the redirection object; and wherein the client program instructions stored in the client system memory, when carried out by the client system processing circuitry, further cause the client system to extract the identifier of the second server, the request method component, and the request body component from the redirection object, and resubmitting the original request by generating and transmitting a request message containing the identifier of the second server system from the redirection object, the request method component from the redirection object, and the request body component from the redirection object.

16. The system of claim 13, further comprising:

wherein the server system memory further stores a directory of entries, each entry corresponding to one of a plurality of authentication domains, wherein each entry includes, with regard to the corresponding one of the authentication domains i) a location of a server to which requests for resources located in the corresponding authentication domain are to be directed, ii) an indication of whether forms-based authentication may be required to access resources in the corresponding authentication domain, iii) a location to which requests to determine whether an authenticated session currently exists with the corresponding authentication domain are to be directed, and iv) a location to which requests for forms-based authentication in the corresponding authentication domain are to be directed; and wherein the client program instructions stored in the client system memory, when carried out by the client system processing circuitry, further cause the client system to generate the redirection object based on an entry in the directory corresponding to the second authentication domain.

17. A computer program product, comprising:

a non-transitory computer readable medium which stores a set of instructions for domain redirection, the set of instructions, when carried out by computer circuitry, causing the computer circuitry to perform a method of:

receiving, at a first server system in a first authentication domain, an original request having a method and a body, the original request transmitted to the first server system in a message from a client program executing on a client system;

parsing, by the first server system, the received original request, wherein the parsing identifies at least one portion of the original request that requires resources from a second authentication domain, the second authentication domain separate from the first authentication domain;

generating, by the first server system in response to the parsing identifying the portion of the original request that requires resources from the second authentication domain, in a memory of the first server system, a redirection object, wherein the generating includes storing an identifier of a second server system in the redirection object, the second server system located in the second authentication domain, and storing a session check flag in the redirection object, the session check flag indicating whether the client system may be required to perform forms-based authentication prior to re-submitting the original request to the second server system; and transmitting a response containing the redirection object from the first server system to the client system.

* * * * *